Feb. 20, 1968     A. M. SCHAIBLE     3,369,760
LIQUID MANURE SPREADER
Filed Sept. 13, 1965
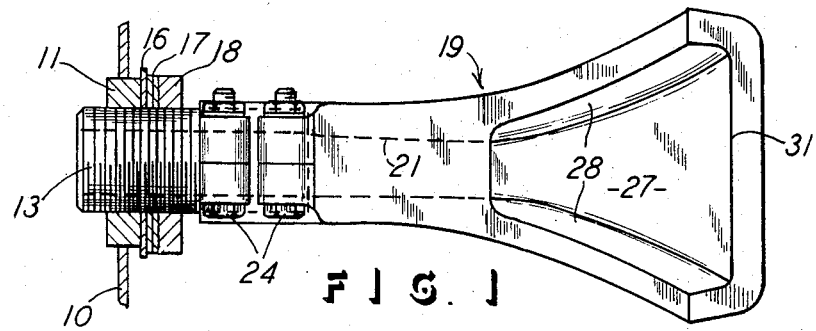
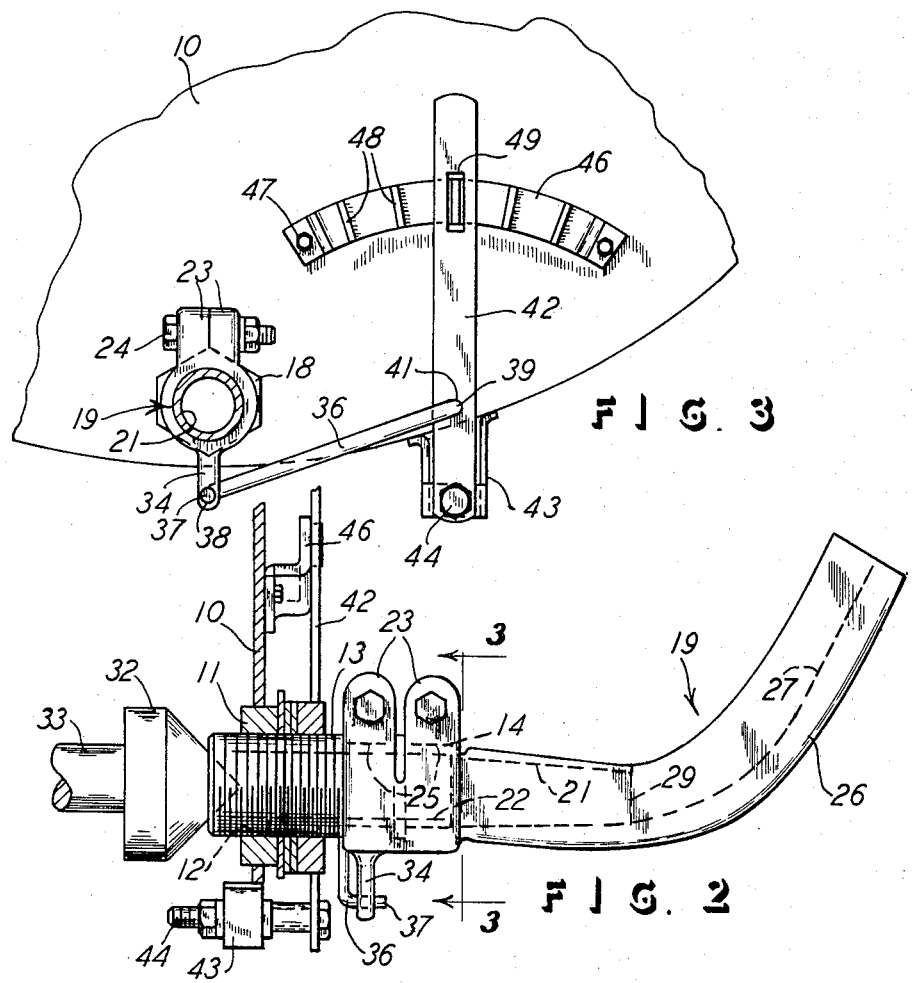
INVENTOR:
AARON M. SCHAIBLE
BY: *Arthur J. Hansmann*
ATTORNEY

United States Patent Office 3,369,760
Patented Feb. 20, 1968

3,369,760
LIQUID MANURE SPREADER
Aaron M. Schaible, Rockford, Ill., assignor to J. I. Case Company, Racine, Wis., a corporation of Wisconsin
Filed Sept. 13, 1965, Ser. No. 486,841
3 Claims. (Cl. 239—513)

ABSTRACT OF THE DISCLOSURE

A liquid manure spreader fan which is rotatable on a tank by means of adjustment members connected to the fan. Indexing means cooperates with the adjustment members to hold the latter in selected positions for selective positioning of the spreader fan.

---

This invention relates to a liquid manure spreader, and, more particularly, it relates to a liquid manure spreader of the type which utilizes a tank which opens to a spreader fan adjustably mounted on the tank to control the pattern of discharge of the liquid manure from the tank as the latter progresses over the ground.

It is a general object of this invention to provide a liquid manure spreader which improves the distribution of the liquid manure over an area of ground traversed by the spreader. More especially, it is an object of the invention to produce a flat and even discharge of liquid manure from the transport tank. In accomplishing these particular objects, the result is that the problem of burning the crop under the tank opening, due to the heavy concentration of manure in this area when using the splash plate spreader construction, will be eliminated.

Another object of this invention is to provide a liquid manure spreader which does not have complicated operating mechanism subject to failure, and thus the spreader of this invention is easily manufactured, easily operated, more readily maintained, more reliable in its operation, and the like.

Still another specific object of this invention is to provide a liquid manure spreader utilizing a spreader fan which incorporates an orifice and a tapered throat of maximum size to allow solids to pass through easily but which still increases the velocity of the material sufficiently to produce an even spreader of the manure. Also, the spreader fan is constructed with a guide vane and venturi throat of a uniform taper to eliminate turbulence in the discharge of the manure and to create a uniform section of liquid manure.

Still another object of this invention is to provide a liquid manure spreader which is readily and easily adjustable to govern and alter the pattern of discharge of the liquid manure. Specifically, the spreader fan can be aimed or rotated with respect to the transport tank so that the manure can be distributed upwardly, downwardly, or even to the side, all as desired.

Other objects and advantages become apparent upon reading the following description in light of the accompanying drawings, wherein:

FIG. 1 is a top plan view of the spreader fan used in this invention and showing a fragment of the transport tank and its mounting in section.

FIG. 2 is a side elevational view of FIG. 1, and with a valve closure added thereto.

FIG. 3 is an end elevational view of the transport tank showing the adjusting and securing mechanism for the spreader fan and with the view being a section taken along the line 3—3 of FIG. 2.

A fragment of a pressurized tank is shown by the tank end wall 10 which has a bushing 11 secured thereto having a threaded hole 12 therein. A pipe 13 is threaded into the bushing 11 to be in fluid-flow communication with the interior of the tank, and the pipe has an end designated 14 extending outside the tank wall 10. A gasket 16, washers 17, and a nut 18 are shown on the pipe 13 to make it fluid tight with the tank wall 10.

A spreader fan, generally designated 19, is secured to the pipe end 14 and is rotatable thereon. The fan 19 has a tapered opening 21 extending through a portion of the fan 19, and the opening 21 is aligned with and in fluid-flow communication with an axial opening 22 in the pipe 13. Thus, material flowing from the tank and into the pipe opening 22 will continue through the fan opening 21 in its flow outwardly from the tank.

Fan clamp portions 23 are included in the fan 19 to secure the fan on the pipe end 14. Bolts 24 extend through the clamp portions 23 for the securing purpose described. This particular arrangement can of course be in any well-known manner so that the fan 19 will be fluid tight but rotatable on the pipe end 14, as mentioned. It can be the tongue-and-groove connection 25.

The fan 19 has an arcuate end 26 which presents a surface 27 and flanking surfaces 28, all three of which extend from the outlet 29 of the fan tapered opening 21. Thus it will be understood that material flowing through the opening 21 will be under pressure and it will be spread out when it passes the outlet 29. The surfaces 27 and 28 will then contain the material which will be evenly distributed along the surface 27 and will be confined by the surfaces 28. The pattern of discharge will naturally be upwardly when the fan is in the upwardly directed position as shown in FIG. 2.

It will also be noted that the surface 27 is tapered or flared toward its discharge edge designated 31, with respect to the portion adjacent the outlet 29.

It will thus be understood that the tank will be transported over the ground to be fertilized, and the liquid manure within the tank will be under pressure so that it will be forced through the openings 22 and 21 and beyond the spreader fan 19. A conically shaped closure 32 is shown in FIG. 2 to be aligned with the axis of the pipe opening 22 for selective opening and closing of the opening 22. Thus a shaft 33 is attached to the closure 32, and the shaft may be suitably mounted and controlled so that the operator can move the closure 32 axially for opening and closing of the discharge opening 22. This control of course could be in any suitable manner and governed by the operator.

To adjust and secure the spreader fan 19 in selected rotated positions, adjustment means are shown in FIG. 3. The fan 19 has an arm 34 attached thereto and extending therebelow in the FIG. 3 position. A connecting rod 36 has an end 37 extending into an opening 38 in the lower end of the arm 34 to attach to the arm 34. The other end of the rod 36 has another angled end 39 which extends into an opening 41 in a pivotally mounted adjustment arm 42. Thus it will be understood that pivotal movement of the adjustment arm 42 will cause displacement of the connecting rod 36 and rotation of the fan 19 so that the desired pattern of manure distribution can be obtained.

The arm 42 is shown mounted on a bracket 43 secured to the circumference of the tank wall 10. The bracket 43 supports a bolt 44 which provides the pivotal mounting and pivot axis for the arm 42.

An adjustment brace 46 is arcuately shaped and attached to the wall 10 by means of screws 47 extending through the ends of the brace 46 and into the wall 10. The brace 46 contains lugs 48 which are received by an opening 49 in the arm 42. The mating of the lugs 48 in the opening 49 secures the arm 42 in a selected pivotal position. Thus the arm 42 can be moved clockwise or counterclockwise, that is in both clockwise directions, about the axis of the bolt 44, and such movement will induce similar rotation in the fan 19. If it were desired to completely invert the fan 19 from the so-called upright position shown in FIG. 2, then the connecting arm 36 can be disconnected from either the fan arm 34 or the adjustment arm 42, and the fan can then be rotated 180 degrees and the arm 36 can again be connected then extending above the fan 19.

There may be a plurality of adjustable fans 19 on the tank for covering a desired path in fertilizing. Each one may be adjustable, as described, and also have the adjustment means, which is an indexing means too.

While a specific embodiment of this invention has been shown and described, it should be obvious that certain changes could be made in the embodiment and the invention should therefore be determined only by the scope of the appended claims.

What is claimed is:

1. A liquid manure spreader comprising a tank for containing liquid manure in a semi-solid state, a spreader fan rotatably connected to said tank and having an orifice in fluid-flow communication with the interior of said tank, said spreader fan including an arcuate and flared surface extending on the projection of the axis of said orifice in the downstream direction from the outlet of said orifice for receiving the liquid manure passing through said orifice and baffling it to throw it into the air in a fan-shaped pattern, adjustment means connected to said spreader fan and extending therefrom in a direction transverse to the axis of said orifice for rotating said spreader fan about the axis of said orifice and relative to said tank, lock means connected to said adjustment means and said tank for releasably securing said adjustment means and said spreader fan in selected rotated positions, and wherein said adjustment means includes a linkage engageable with said lock means and being pivotal between selected pivoted positions for setting said spreader fan in selected rotated positions.

2. The subject matter of claim 1, wherein said lock means includes indexing means having a plurality of index stops for releasably setting said adjustment means in said selected rotated positions.

3. The subject matter of claim 1, wherein said adjustment means includes a pivot arm and said lock means has a plurality of index stops for setting said pivot arm in selected positions.

References Cited

UNITED STATES PATENTS

| | | | |
|---|---|---|---|
| 826,890 | 7/1906 | Schafer | 239—176 |
| 1,009,097 | 11/1911 | Ratican | 239—172 |
| 2,501,555 | 3/1950 | White | 239—172 |
| 2,921,488 | 1/1960 | Davis | 239—523 |
| 3,136,485 | 6/1964 | Bellows et al. | 239—172 |
| 3,144,211 | 8/1964 | Goldman | 239—523 |

FOREIGN PATENTS 1,342,340   9/1963   France.

EVERETT W. KIRBY, *Primary Examiner.*